United States Patent
Evans

[15] 3,692,149
[45] Sept. 19, 1972

[54] CAM ACTUATED INTERLOCK FOR PIVOT ARM
[72] Inventor: John H. Evans, Springfield, Ill.
[73] Assignee: Allis-Chalmers Manufacturing Company, Milwaukee, Wis.
[22] Filed: May 26, 1971
[21] Appl. No.: 146,900

[52] U.S. Cl. .................. 188/69, 74/814, 91/445, 172/781, 172/793
[51] Int. Cl. ............................................. B62c 7/02
[58] Field of Search ...... 188/30, 60, 69; 91/410, 445; 74/814; 172/781, 789, 793, 798; 280/6.11

[56] References Cited
UNITED STATES PATENTS 2,211,406  8/1940  Cannon ................. 188/69 X
2,801,553  8/1957  Reynolds ............... 188/69 X
3,400,767  9/1968  Hermiz ................. 188/31 X
3,454,110  7/1969  Hanser ................. 172/793

Primary Examiner—George E. A. Halvosa
Attorney—Charles L. Schwab, Robert B. Benson and Kenneth C. McKivett

[57] ABSTRACT

A control circuit for a locking pin which releasably locks a swingable support member of a tool positioning mechanism to a vehicle frame member. A cam actuated blocking valve in the circuit prevents movement of the locking pin actuator when the pin is not aligned with a hole. A locking valve in the locking pin actuator circuit insures locking pin tightness.

9 Claims, 5 Drawing Figures

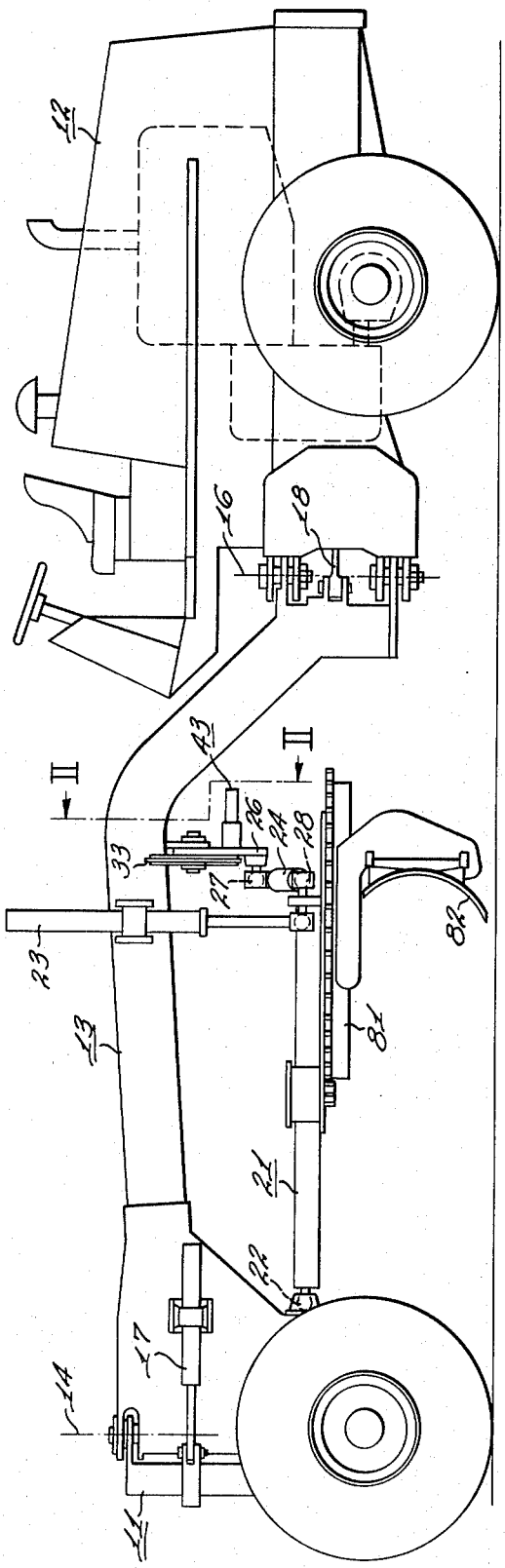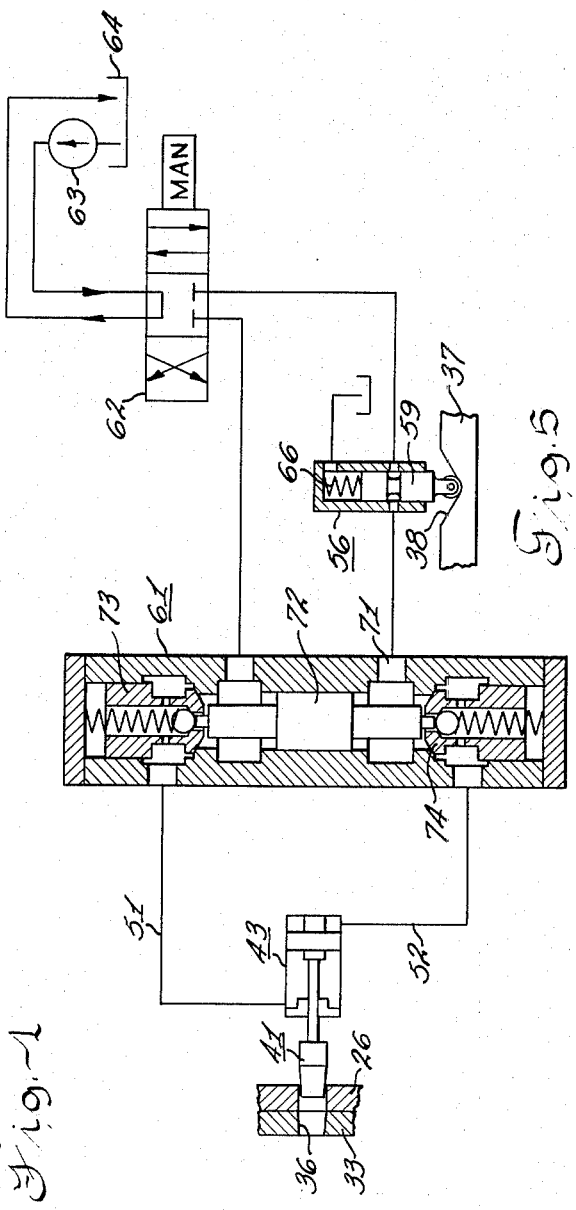
Fig. 1
Fig. 5

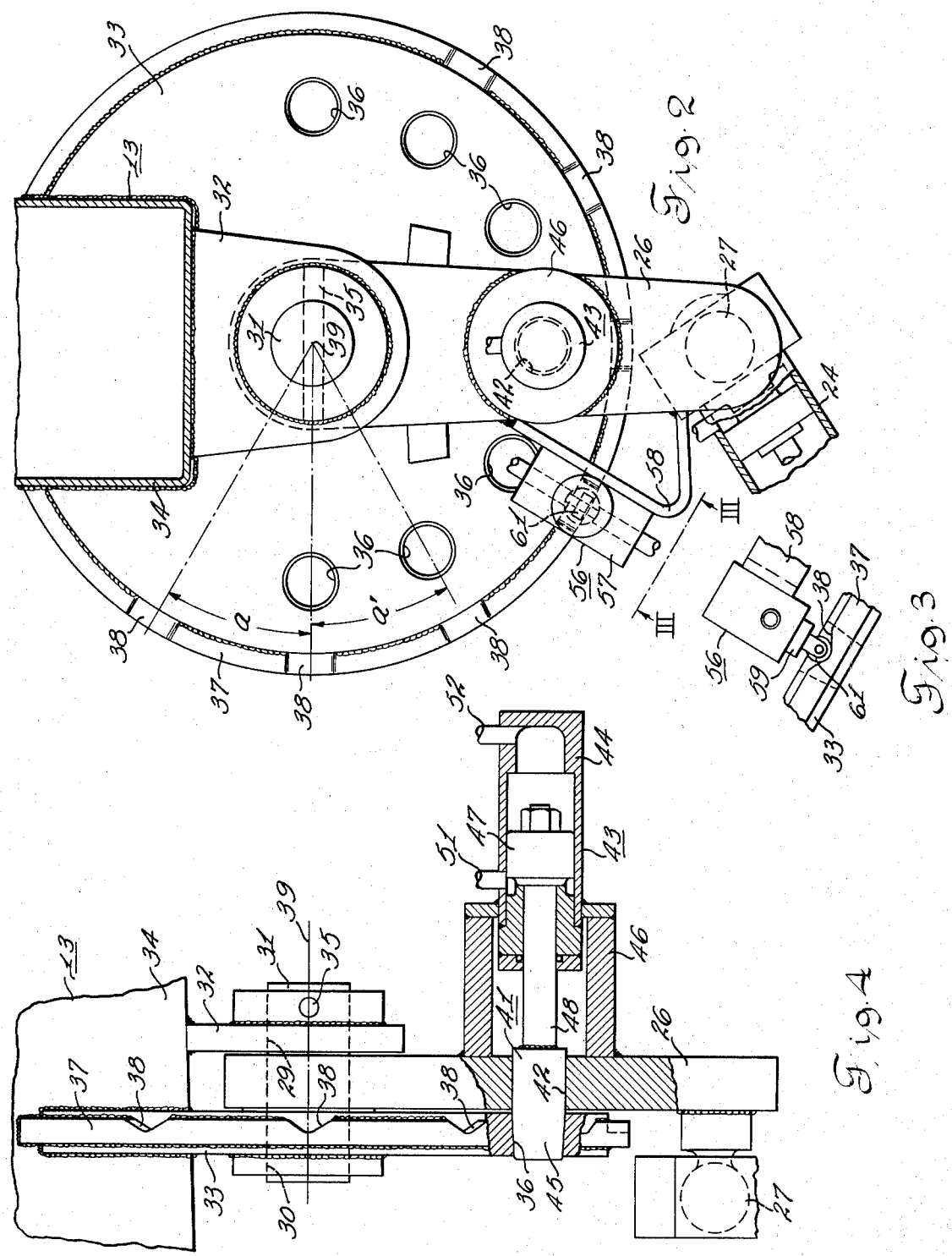

CAM ACTUATED INTERLOCK FOR PIVOT ARM

BRIEF SUMMARY OF THE INVENTION

A power operated pin is used to selectively position a swingable support arm of a position control mechanism, such as the side shift control mechanism of a motor grader. Damage to components is prevented by using a control circuit having a cam operated blocking valve which opens to allow hydraulic fluid flow to the actuator to move the pin into locking position only when the pin is aligned with one of several circumferentially spaced holes. A plurality of cam means in the form of circumferentially spaced detents, in the form of indentations, cooperate with the blocking valve, the latter moving to an open position when a control element part thereof registers with one of the several detents. A locking valve is incorporated into the locking pin actuator circuit to insure continuous lock pin tightness in the hole in which inserted.

BRIEF DESCRIPTION OF THE DRAWING

FIG. 1 is a side view of a motor grader in which the present invention is incorporated;

FIG. 2 is a view taken along the line II—II in FIG. 1;

FIG. 3 is a view taken along the line III—III in FIG. 2;

FIG. 4 is a side view of the structure shown in FIG. 2 with parts broken away for illustration purposes; and FIG. 5 is a schematic showing of the hydraulic control system for the retractable locking pin.

DETAILED DESCRIPTION OF THE ILLUSTRATED EMBODIMENT OF THE INVENTION

Referring to FIG. 1, the invention is illustrated in a motor grader having front and rear units 11, 12 articulatively connected to opposite ends of a frame 13 on vertical axes 14, 16 for steering relative thereto be steering means 17, 18. This type motor grader is more fully illustrated and described in United States Letters Patent to Andrew V. Hampton, U.S. Pat. No. 3,527,315, Articulated Motor Grader, granted Sept. 8, 1970. While the invention is illustrated and described in an articulated motor grader, it should be understood that it may find advantageous application in other types of motor graders and other earthworking vehicles.

Continuing with the description, a subframe 21 is universally connected at its forward end to frame 13 by a ball and socket joint 22 and is supported at its rear end by a pair of double-acting hydraulic jacks 23, only one of which is shown. The subframe is side shifted, in a transverse direction, by a double-acting hydraulic jack 24 having its rod and cylinder components pivotally connected to a circle assembly 81 of the subframe 21 and a support member 26 by ball and socket joints 27, 28, respectively.

Referring also to FIGS. 2 and 4, the support member 26 is pivotally connected to the frame 13 by a pivot pin 31. Opposite ends of the pin fit in aligned openings 29, 30 in longitudinally spaced members 32, 33 welded to gooseneck 34 and is held against rotation by a retainer 35. Vertically disposed frame member 33 is disk-shaped and presents a plurality of circumferentially spaced, tapered openings 36. The frame member 33 also has welded thereto a ringlike rim part 37 which has cam means comprising circumferentially spaced detents in the form of indentations 38. The angular spacing of the indentations 38 corresponds with the angular spacing of the openings 36, with reference to the axis 39 of pivot pin 31 about which support member 26 pivots. In other words, the angle $a$ equals the angle $a'$ as shown in FIG. 2.

A tapered locking pin 41 slidably mounted in a bore 42 in support member 26 is selectively entered into one of the tapered openings 36 by a hydraulic actuator in the form of a double-acting hydraulic jack 43. The locking pin 41 has a tapered portion 45 adapted to tightly engage the tapered openings 36, the taper of portion 45 and the taper of openings 36 being at the same angle. The jack 43 includes a cylinder component 44 secured to support member 26 through an intermediate support structure 46 and a piston component 47 with a rod 48 secured as by welding to pin 41. Hydraulic fluid is supplied to the jack 43 through a pair of supply conduits 51, 52. As shown in FIGS. 2 and 3, a blocking valve 56 has its housing 57 rigidly secured by means, not shown, to a bracket 58 welded to the swingable support member 26. The flow control element 59 of blocking valve 56 carries a roller 61 on its exposed end which engages the rim part 37 and its indentations 38. As shown in FIG. 3, the roller 61 is in one of the indentations 38.

The control circuit for the locking pin jack 43 is shown in the schematic illustration of FIG. 5, to which the reader is now referred. As illustrated, the pin 41 is held in its retracted position by contracted jack 43. Hydraulic fluid is locked in the conduits 51, 52 by a conventional locking valve 61, inasmuch as the open center control valve 62 is in its neutral position. In this position, the pump 63 supplying hydraulic fluid to an open center control valve 62 merely returns it to the reservoir 64. Also as shown in FIG. 5, the blocking valve 56 is shown in its open position wherein its flow control element 59 is urged into one of the indentations 38 by a spring 66. In this condition of the control circuit, that is with locking pin 41 in its retracted position, the support member 26 may be pivoted about axis 39, either manually or by actuation of double-acting jack 24, to a new position in which the pin 41 is aligned with a different opening 36. At such new position, the flow control element 59 will cooperate with a different indentation 38; thus allowing the pin 41 to be extended into an aligned opening 36 upon movement of the manually operated control valve 62 to the appropriate one of its two operating positions (to the left as shown in FIG. 5). In such operating position of valve 62, pressurized fluid is delivered to port 71 of locking valve causing spool 72 to be moved upwardly to unseat valve member 73 allowing fluid in the rod end of jack 43 to return to reservoir 64. The pressurized fluid will open valve member 74 to permit delivery of pressurized fluid to the closed end of jack 43 causing it to expand; thus driving pin 41 into the aligned opening 36.

When the support member 26 is between positions in which the pin is aligned with an opening 36, the flow control element 59 will be cammed to a closed position in which fluid flow to the actuator via conduit 52 is blocked; and thus, the pin 41 cannot be extended to its locking position. This prevents accidental damage to the components of the locking mechanism which might otherwise occur in absence of the blocking valve 56.

After the locking pin 41 has been driven tightly into a tapered hole 36, the circle assembly 81 and rotatably attached blade 82 may be side shifted by operation of jack 24 which is controlled by a separate control circuit, not shown.

The embodiments of the invention in which an exclusive property or privilege is claimed are defined as follows:

1. A control system for an extensible and retractable locking pin releasably securing a pivotable support member for a tool positioning mechanism of an earthworking vehicle in any one of a plurality of angularly spaced positions relative to a frame member of the vehicle, said control system comprising:
   a source of pressurized hydraulic fluid,
   a control valve connected to said source and having a neutral and a pair of operating positions,
   means reciprocably mounting said locking pin on one of said members,
   a double-acting hydraulic jack having extensible and contractable components connected to said one member and locking pin, respectively, and operable to move the latter between its extended and retracted positions,
   a plurality of openings in the other of said members, selectively, registrable with said pin upon pivotal movement of said support member to said angularly spaced positions,
   a pair of conduits interconnecting said control valve and jack,
   a plurality of cam means on said frame member spaced circumferentially in relation to the pivot axis of said pivotable support member at angular spacing corresponding to the angular spacing of said openings relative to said pivot axis, and
   a blocking valve hydraulically connected in flow controlling relation to at least one of said conduits including a flow control element operatively associated with said cam means and shiftable between open and closed positions, said flow control element shifting to its open position in response to predetermined cooperation with any one of said cam means thereby permitting extension of said jack to extend said pin into one of said openings aligned therewith, said flow control element being in its closed position when not cooperatively engaged by said cam means, thereby preventing extension of said locking pin.

2. The invention of claim 1 wherein said pin and opening are tapered at the same angle.

3. The invention of claim 1 wherein said one member is said pivotable support member.

4. The invention of claim 3 wherein said cam means are indentations in said frame member.

5. The invention of claim 4, wherein said extensible and contractable components are a cylinder and a piston and wherein said cylinder is connected to said support member.

6. The invention of claim 1 and further comprising locking valve means connected to said conduits and operative to prevent movement of said jack unless said control valve is in an operating position and said pressure of hydraulic fluid delivered by said source exceeds a predetermined value.

7. The invention of claim 6, wherein said one member is said pivotable support member.

8. The invention of claim 7, wherein said cam means are indentations in said frame member.

9. The invention of claim 8, wherein said extensible and contractable components are a cylinder and a piston and wherein said piston includes a rod secured to said locking pin and said cylinder is secured to said support member.

* * * * *